Patented Feb. 21, 1950

2,498,480

UNITED STATES PATENT OFFICE 2,498,480

METHOD OF PREPARING FERTILIZER CONCENTRATE

Knud George Bierlich, West Palm Beach, Fla., and Edward Oldroyd Whiteley, New York, N. Y.

No Drawing. Application May 19, 1945, Serial No. 594,799

3 Claims. (Cl. 71—23)

This invention relates to a method of preparing fertilizer concentrate and products so obtained, which concentrate can be employed as a substitute for composts and manures in fertilizing the soil and also for so-called soilless or hydroponic growth of plants and for imparting nutrient or other beneficial materials in a readily assimilable form for the benefit of plant and sea life in general.

Heretofore woody substances or cuttings have been considered undesirable in composts because of the presence therein of resins and gums which retard their decomposition by bacteria. Accordingly, artificial composts are generally made by mixing green vegetable matter with fertilizer or by adding chemical fertilizers to garden or farm composts formed from refuse. Considerable time, such as several months, is required before these composts are reduced by bacterial action into humus and the final product is of a relatively indeterminate and unstandardized composition. In use it liberates its soil-feeding components automatically and added soluble fertilizers tend to be rapidly washed away in rainy weather. This requires the repeated retreatment of the soil at intermittent periods in order that the desired nutrient content may be maintained.

In the soilless growth of plants and in the culture of sea-life, there is a need for fertilizing or feeding media which will liberate the desired nutrients into the water at a relatively slow rate so that this method of culture can be simplified over the present more cumbersome practice of either adding fertilizer solution from time to time to the water bath in which the plants or sea-life are growing, or by slowly permitting relatively concentrated solution, maintained in suitably disposed inverted glass bottles, to diffuse into the surrounding water.

By the present invention there is provided an improved fertilizer concentrate which, in its broadest aspects, can be employed for the fertilizing of soil or for the feeding of sea-life and in the hydroponic growth of plants. The fertilizer compost prepared in accordance with this invention is resistant to climatic action and does not require replacement by fresh compost or humus after a rainfall. It is so compounded as slowly to liberate its nutrient content to the soil or into the water on/or in which it may be placed so that plant or animal life may consistently derive nutrition therefrom at a relatively slow and stabilized rate. There is no danger that plant roots may become burnt from excessive fertilizer. Furthermore, there is here provided a very highly concentrated article of commerce which weighs as little as from 8 to 10 pounds per cubic foot compared with 26 pounds per cubic foot for standardized farm fertilizer. It may contain from 30–45% by weight of active nutrient salts whereas standard fertilizer averages only about 20%.

In accordance with this invention the improved fertilizer concentrate comprises a water insoluble granular porous cellular absorbent carrier which is impregnated with a soluble fertilizing compound associated with a wetting agent and finely divided bentonite clay, all in a substantially dry state.

The carrier is preferably derived from cellulosic material although fairly satisfactory substitutes for the preferred cellulosic material are pumice, charcoal, air-celled glass fiber and even plaster of Paris. The carrier, in any case, must be relatively resistant to weathering, not easily broken down or converted into dust, light and highly absorbent.

The carrier is impregnated with soluble fertilizer under pressure so that the fertilizer enters into the innermost pores and cells of the carrier structure. Concentrated solutions of all kinds of fertilizing compounds may be used and after the impregnation has been completed, the carrier is then dried, and, if desired, granulated or formed into pellets for convenient use.

Either during or before the impregnation step or, if desired in both cases, there is incorporated in the carrier finely divided bentonite clay preferably associated with a wetting agent. The clay helps to entrain the soluble fertilizer in the porous carrier and to restrict its liberation therefrom so that in use the improved fertilizer concentrate slowly liberates its nutrient constituents by action of rain water or the water in the cultivating tank or sea in which it may be placed, without at any time permitting the concentrated fertilizer to flood the surrounding area with excessively strong salts which would damage the plant or animal life in which they may come into contact.

The preferred carrier is a substantially non-fibrous partially degummed cellulosic carrier. At the same time floatable cellulosic carriers, such as kapok fiber, cork and similar substances of low specific gravity may be employed. The latter are especially useful in soilless growth of plants and in feeding sea-life. Thus for this purpose we may use kapok floss, air-celled glass filaments, cork bark granulations, cattail floss or *Baccharis hamilifolia* floss, all of which have a low specific gravity and will support about 25 times their own weight without sinking.

The preferred carrier for most purposes is derived from cellulosic refuse, such as from sawdust secured from woods such as southern pine, yellow pine, oak, red wood, fir or slash pine. Soft wood is preferably used but we may also employ tree prunings, corn husks, chaff, corn hulls, sugar cane fiber or other cheap cellulosic material.

In the preferred practice of the invention the cellulosic base material is macerated to cause granular size reduction and the granular substance so secured may then be passed through a rotary screen to grade it into different sizes for specific uses. The granulated and screened material is then purified or depitched so as to remove the greater part but not all of the contained sterols, lignins, gums, oils and resins. This results in an adsorbent and greatly increased surface area and in a cellular structure which is especially adapted for the rapid imbibing and retaining of high percentages of concentrated fertilizer solutions.

In order to purify or depitch cellulose base substances of the kind referred to, they may be treated with suitable wetting agents, such as basic amines, acids and alkalies, alone or in admixture with each other or with finely divided bentonite clay. The preferred method in accordance with this invention is to treat the cellulosic material with an aqueous dispersion or solution of ultra-fine bentonite clay particles and a saponifying agent, such as a basic amine, for example, triethanolamine.

The basic amines which may be employed are the amines which act as wetting agents, especially the alkyl or aryl amines, of which the following are satisfactory examples:

Butylamine ($CH_3CH_2CH_2CH_2NH_2$)
Triethylene tetramine
Ethylene diamine
Ethylenediamine
Morpholine
Diethylethanolamine
Phenylethanolamine
Phenyldiethanolamine
Triisopropanolamine
Chloracetoacetanilide
Acetoacet-o-toluidide
Tetraethanolammonium hydroxide
Triethanolamine
Diethylhexylamine
Diethylenetriamine
Monoethanolamine
Phenylethanolamine
Amineoethylethanolamine
Ethylphenylethanolamine
Acetoacenanilide
Dischloracetoacetanilide
Phenylmethylpyrazolone For the purpose of depitching and making a cellular carrier, the cellulosic base material is deposited into a washing vat or breaker beater which contains the wetting agent and the clay. The washing process may be carried out cold or hot. It takes about 15 minutes at ordinary (40° or 80° F.) temperature and about half this time using hot water. After thoroughly mixing, there is formed a resinous soapy slurry which is allowed to drain off. This operation may be repeated if desired to achieve more complete purification or separation of the resins from the cellulose, but it is at no time so conducted as to reduce the base material to cellulose fiber. In other words, some resins, etc. are retained to maintain the original structure without forming anything in the nature of paper pulp or pure cellulose. Electrokinetic action causes the clay and basic amine to combine with the resins, sterols and gums to form the soapy mixture which, as indicated, is drained off to leave a cellular sponge-like residue.

The residue is thoroughly washed with water to remove substantially all of the resinous soap therefrom. The product is then allowed to drain for several hours and finally it may be dried in a high speed rotary drier to reduce its moisture content to about 50%.

In this treatment some of the clay and traces of the basic amine remain entrained in the cellulose and they act to anchor the fertilizer therein during the subsequent impregnation of the carrier with the fertilizer solution.

In the preferred process, the purified cellulosic substance which is now of high porosity is conveyed into a wet or dry steam chamber, autoclave or rotary digester, or even into a hydraulic press. The pressure employed in the impregnation operation is from one to three atmospheres for about 15 minutes. Concentrated solutions of fertilizer of any desired composition are introduced into the autoclave or the like and ultra-fine bentonite clay particles and dilute solutions of basic amines may also be incorporated.

The impregnated material is then dehydrated to a moisture content of approximately 5 to 30% by any suitable method, such as by use of a cyclone heat drier, a vacuum drier, radio induction or megatherm systems.

The operation of impregnating the cellulosic substance with highly concentrated chemical aqueous solutions or dispersions is, as indicated, effected under pressure. The fertilizing substances may be incorporated in different amounts or formulations as desired and as needed for growth of cellulosic and protoplasmic tissue. The basic needs are supplied by eleven mineral salts, a supply of carbohydrate, vitamins and amino acids. Several species of soil or other saprophytic bacteria able to capture and fix atmospheric nitrogen may also be incorporated. Fluorescent dyestuffs, such as eosine and fluorescein, yeasts, hormones, enzymes, amino acids and growth stimulating compounds in general may be included. Where the carrier is non-cellulosic or has not been treated with bentonite clay, then dispersions of the ultrafine bentonite particles preferably associated with minute traces of basic amines are included in the fertilizing solution with which the base is impregnated. When use is made of a carrier, such as air-celled glass fiber, its treatment with bentonite clay and basic amine causes the fibers to be bonded together.

The fertilizing solutions employed vary according to their composition in accordances with the intended use. Some of the substances may be incorporated in trace amounts of 10 parts in a million. Flotation type fertilizer concentrate for use on bodies of water can be used to increase the growth of fish and can be employed for the surface fertilization of fresh water lakes or ponds as well as applied to lagoons of coastal sea waters. Therefore it will be appreciated that in the following examples the form in which the basic chemicals referred to as actually employed may vary in line with the knowledge of those skilled in this art.

In the following examples the parts are by weight:

*Example 1*

1 part of cellulosic refuse, such as southern pine sawdust, is formed into a slurry with about 3.5 parts of washing solution composed of 0.5 part of triethanolamine, 2.5 parts bentonite clay particles of below 5 micron size, and preferably below 0.3 micron size, and 97 parts of water.

The slurry is mixed or agitated for 15 minutes at ordinary temperatures. If the water solution employed is heated as to 50°–60° C., the time of mixing may be reduced to about 8 minutes. A resinous soapy liquid is formed which on standing splits from the cellulosic material and is drained off. The residue is washed vigorously with cold water until substantially free from soap. It is then dried to reduce its moisture content to 50% by weight as by placing it in a high speed rotary drier.

The ultra-fine bentonite clay employed is formed by hydrating bentonite clay and then elutriating the resulting solution or dispersion to obtain those particles of not more than 5 micron size, efficient elutriation yielding 85% to 90% of particles of this size. In place of elutriation, we may use a supercentrifuge or effect the desired particle subdivision by the application of ultrasonic pressure wave vibrations to the clay suspension. Clay particles having a size of 0.1 micron diameter are particularly efficient.

The carrier prepared in accordance with the preceding example can be impregnated with any desired chemical composition for the treatment of all types of soil, etc. Precise fertilizer formulae may be compounded of known nutrient chemicals according to State and Federal agricultural laws governing the sale and use of fertilizers.

The fertilizing compositions specifically set forth in the following examples are incorporated in the carrier by immersing the latter in the solution in an autoclave under a pressure of from 1 to 3 atmospheres for 15 minutes. The material is then dried to a moisture content of approximately 5% to 30% by weight and, if desired, it may be further granulated.

In the following examples the composition of fertilizer concentrates prepared in this manner is set forth in terms of the complete fertilizer in its final relatively dry state. The cellular or cellulosic substance referred to represents the carrier.

*Example 2*

1.5 gm. $KH_2PO_4$
1.5 gm. $Ca(NO_3)_2$
0.5 gm. $MgSO_4.7H_2O$
0.04 gm. bentonite clay, sub-micron particles
0.008 gm. triethanolamine
50.00 mg. dextrose
0.5 mg. thiamin
0.0001 P. P. M. pantothenic acid
0.2 mg. glycine
2.0 mg. eosin or fluorescein
0.005 P. P. M. B
0.02 P. P. M. Cu
0.1 P. P. M. Fe
0.01 P. P. M. Ga
0.01 P. P. M. Mn
0.01 P. P. M. Mo
0.09 P. P. M. Zn
5.5 gm. cellular or cellulosic substance of approximately 10% to 20% moisture content.

*Example 3*

The formulas which will supply all major elements, trace elements, may be added along with growth stimulating factors.

| (I) | (II) |
|---|---|
| $K_2SO_4$ | $KH_2PO_4$ |
| $Ca(NO_3)_2$ | $CaSO_4$ |
| $MgHPO_4$ | $Mg(NO_3)_2$ |

10 grams of each substance, to which is added
0.3 gram bentonite clay
0.06 gram triethanolamine
60.0 grams cellular or cellulosic substance of approximately 10% to 20% moisture content.

*Example 4*

| | Per cent |
|---|---|
| Potassium nitrate | 56. |
| Calcium nitrate | 11.3 |
| Triple superphosphate | 15.3 |
| Epsom salts | 13.5 |
| Sulphuric acid or citric acid | 1.8 |
| Iron sulphate | 1.4 |
| Manganese sulfate | 0.2 |
| Borax | 0.17 |
| Zinz sulfate | 0.08 |
| Copper sulfate | 0.06 |
| Glycine | 0.08 |
| Bentonite clay | 0.64 |
| Triethanolamine | 0.32 |

Cellulosic or cellular carrier of 10% to 20% moisture content, 40% to 50% of chemicals This is an all purpose formula for general use.

*Example 5*

| | Grams |
|---|---|
| Sulfate of ammonia | 4 |
| Superphosphate (concentrate) | 2 |
| Muriate of potash (concentrate) | 2.5 |
| Calcium carbonate | 3 |
| Trace elements iron, boron, copper, amino acids, basic amines, bentonite clay, pantothenic acid, eosin, etc. | |
| Cellulosic or other flotation fiber or granules | 10–20 |

This formula is for fish cultivation or the growth of phytoplankton, zooplankton, etc.

*Example 6*

This is an example of a single chemical substance, which may be used in its various forms, as an oxide, chloride, sulfate, sulphate, acetate or other.

| | Per cent |
|---|---|
| Iron | 40 to 60 |
| Water, amino acids and enzymes | 10 to 20 |
| Cellulosic or non-cellulosic carrier base | 40 |

*Example 7*

| | Per cent |
|---|---|
| Sodium or potassium salts | 40 to 60 |
| Water | 10 to 20 |
| Cellulosic or non-cellulosic carrier base | 40 |

To create better adhesion of the chemical substances and to control their release by hydration, to each formula we may add about 1% to 2% of bentonite clay particles having a size of 1 micron or less, and about $\frac{1}{10}$ to $\frac{1}{5}$ of 1% of a basic amine to the aqueous chemical content.

The fertilizer so prepared may be used for plant growth promotion or soil conditioning or in water cultures and obviously, concentrates of different compositions may be combined to create a soil-chemical balance suited to any crop or growth stimulation.

It has the quality of releasing automatically enough chemical nutrients to the soil at each rainfall, when used on land, without itself being completely dissipated or washed away; it cannot easily be washed through into the subsoil. The nutrients are released in such small amounts that they do not burn plant life, live protoplasmic tissue, or destroy functional plant bacteria, but on the contrary, they feed them. It has the same inhibited action in this respect as rich humus or top soil. The cellulosic components of the preferred concentrate are subject to decomposition by cellulose decomposing bacteria. The removal from the cellulose of the greater part of the sterols, waxes, resins and gums facilitates this natural slow decomposition and the increased porosity imparted to the cellulose allows it to act as a host for soluble chemical compounds and desirable micro-organisms.

As compounded in variable amounts all formulas yield slowly dissolving or leaching soluble nutrient salts in aqueous concentration of not less than $1/1000$ of 1% (1 in 100,000) for each 1 inch of rainfall or irrigation, and isotonic or exosmose reaction. This is computed to yield not less than $1/10$ of 1% or 1 in 1000 parts of nutrients into the soil or aqua per annum or growing season.

We claim:

1. A method of preparing a fertilizer concentrate which comprises immersing cellulose refuse containing gums and resins in a solution of a saponifying agent associated with finely divided bentonite clay in aqueous suspension at ordinary temperatures to form a slurry of the mixture, then washing the product to remove the resulting aqueous soapy mixture, drying the residue and thereafter impregnating said residue under super atmospheric pressure with a solution of fertilizer and finally drying the product.

2. A method of preparing a fertilizer concentrate which comprises immersing natural cellulosic material containing gums and resins in an aqueous dispersion of finely divided bentonite clay and a water soluble basic amine to dislodge from the cellulosic material the greater part, but not all, of the contained resins and gums, draining off the aqueous portion of the mixture, washing the residue with water, drying it and then impregnating it with a solution of a fertilizer, drying the so-treated material and finally forming the resulting product into pellets or granules.

3. A method of preparing a fertilizer concentrate which comprises immersing cellulose refuse containing gums and resins in an aqueous dispersion of ultra-fine bentonite clay particles of the order of not more than about 5 microns size together with a basic amine, to form a slurry, draining the aqueous dispersion from the solid residue to remove therefrom the greater part, but not all, of the contained resins and gums, washing the solid residue with water, drying it, then immersing it in a concentrated solution of fertilizer under superatmospheric pressure, removing it from the solution and drying it to a moisture content of from about 5% to 30% by weight and then cutting it into pellets or granules.

KNUD GEORGE BIERLICH.
EDWARD OLDROYD WHITELEY.

REFERENCES CITED

The following references are of record in the file of this patent:

UNITED STATES PATENTS

| Number | Name | Date |
|---|---|---|
| 847,749 | Ellis | Mar. 19, 1907 |
| 1,944,788 | Genz | Jan. 23, 1934 |
| 1,974,877 | Schubert | Sept. 25, 1934 |
| 1,978,102 | Clapp | Oct. 23, 1934 |
| 2,097,457 | Grether | Nov. 2, 1937 |
| 2,205,807 | Bjorksten | June 25, 1940 |
| 2,218,695 | Leatherman | Oct. 22, 1940 |
| 2,315,372 | Kressman | Mar. 30, 1943 |

FOREIGN PATENTS

| Number | Country | Date |
|---|---|---|
| 252,039 | Great Britain | May 17, 1926 |
| 426,380 | Great Britain | Apr. 2, 1935 |